(12) United States Patent
Goodman et al.

(10) Patent No.: US 11,431,553 B2
(45) Date of Patent: *Aug. 30, 2022

(54) REMOTE CONTROL PLANES WITH AUTOMATED FAILOVER

(71) Applicant: Amazon Technologies, Inc., Seattle, WA (US)

(72) Inventors: Alan Hadley Goodman, Issaquah, WA (US); Georgios Elissaios, Seattle, WA (US); Diwakar Gupta, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 307 days.

This patent is subject to a terminal disclaimer.

(21) Appl. No.: 16/450,848

(22) Filed: Jun. 24, 2019

(65) Prior Publication Data

US 2020/0403847 A1 Dec. 24, 2020

(51) Int. Cl.
| | |
|---|---|
| *H04L 41/00* | (2022.01) |
| *H04L 41/0663* | (2022.01) |
| *H04L 41/0668* | (2022.01) |
| *G06F 16/29* | (2019.01) |
| *H04L 41/0893* | (2022.01) |
| *H04L 43/0882* | (2022.01) |

(52) U.S. Cl.
CPC ......... *H04L 41/0663* (2013.01); *G06F 16/29* (2019.01); *H04L 41/0668* (2013.01); *H04L 41/0893* (2013.01); *H04L 43/0882* (2013.01)

(58) Field of Classification Search
CPC ......... H04L 12/00; H04L 12/24; H04L 12/26; H04L 67/42; H04L 12/2863; H04L 12/2867; H04L 45/50; H04L 47/828
See application file for complete search history.

(56) References Cited

U.S. PATENT DOCUMENTS

| | | |
|---|---|---|
| 9,424,062 B1 | 8/2016 | Subramanian et al. |
| 10,187,289 B1 | 1/2019 | Chen et al. |
| 10,333,789 B1 | 6/2019 | Dippenaar et al. |
| 2006/0209682 A1* | 9/2006 | Filsfils ................... H04L 45/28 370/219 |
| 2007/0053359 A1* | 3/2007 | Wu ......................... H04L 45/64 370/392 |

(Continued)

OTHER PUBLICATIONS

International Search Report and Written Opinion, PCT App. No. PCT/US2020/037764, dated Sep. 25, 2020, 14 pages.

(Continued)

*Primary Examiner* — Abdelillah Elmejjarmi
(74) *Attorney, Agent, or Firm* — Nicholson De Vos Webster & Elliott LLP

(57) ABSTRACT

Techniques for automated failover of remote control planes are described. A method of automated failover of remote control planes include determining failover event associated with a first control plane has occurred, the first control plane associated with a first area of a provider network, identifying a second control plane associated with a second area of the provider network, and failing over the first area of the provider network from the first control plane to the second control plane, wherein the child area updates one or more references to endpoints of the first control plane to be references to endpoints of the second control plane.

20 Claims, 11 Drawing Sheets

(56) References Cited

U.S. PATENT DOCUMENTS

| | | | |
|---|---|---|---|
| 2011/0099420 A1* | 4/2011 | MacDonald McAlister | ............... G06F 16/178 714/6.32 |
| 2014/0207918 A1 | 7/2014 | Kowalski et al. | |
| 2016/0380832 A1 | 12/2016 | Purushotham et al. | |
| 2018/0026867 A1* | 1/2018 | McAlister | ........... G06F 11/3006 709/224 |
| 2018/0239651 A1* | 8/2018 | Gong | .................. G06F 11/3423 |
| 2018/0322022 A1 | 11/2018 | Carl et al. | |
| 2018/0324247 A1 | 11/2018 | Hood et al. | |
| 2019/0146998 A1 | 5/2019 | Jin et al. | |
| 2019/0333383 A1 | 10/2019 | Woodrow et al. | |
| 2020/0151023 A1* | 5/2020 | Bai | ........................ H04L 67/34 |
| 2020/0342418 A1 | 10/2020 | Zatta et al. | |

OTHER PUBLICATIONS

Non-Final Office Action, U.S. Appl. No. 16/450,854, dated Apr. 21, 2021, 16 pages.
Hinden, et al., "Unique Local IPv6 Unicast Addresses", Network Working Group, Request for Comments: 4193, Oct. 2005, 16 pages.
Rekhter, et al., "Address Allocation for Private Internets", Network Working Group, Request for Comments: 1918, Feb. 1996, 9 pages.
International Preliminary Report on Patentability, PCT App. No. PCT/US2020/037764, dated Jan. 6, 2022, 9 pages.

* cited by examiner

REMOTE CONTROL PLANES WITH AUTOMATED FAILOVER

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine is a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for remote control planes with automated failover. According to some embodiments, hardware resources in an area of a provider network may be managed by a remote control plane located in a different area of the provider network. Unlike systems where the control plane and the resources being managed must be collocated in the same area of the provider network, embodiments described here break this coupling, enabling resources to be managed remotely in case of failure, insufficient control plane capacity, or other issues. Embodiments may enable an area to use multiple remote control planes as needed. In some embodiments, the remote control planes available for particular resources may be limited based on distance, network latency, or other performance characteristics or user preferences. A control plane monitoring service can monitor availability of remote control planes and the status of the particular remote control plane managing a particular area. Should that control plane become impaired, the control plane monitoring service can cause the area to switch to using a different remote control plane.

In addition to failover use cases, transfer of management of an area's resources to a new control plane(s) may be caused by other triggers. For example, based on the monitoring of the various available control planes, it may be determined that a different control plane would provide a particular area with improved performance. The monitoring system can then transparently transfer management of all or some of the area's resources to the new control plane. In some embodiments, traffic surges or other load spikes may similarly trigger a failover of all or some resources to one or more remote control planes.

Figure 1:
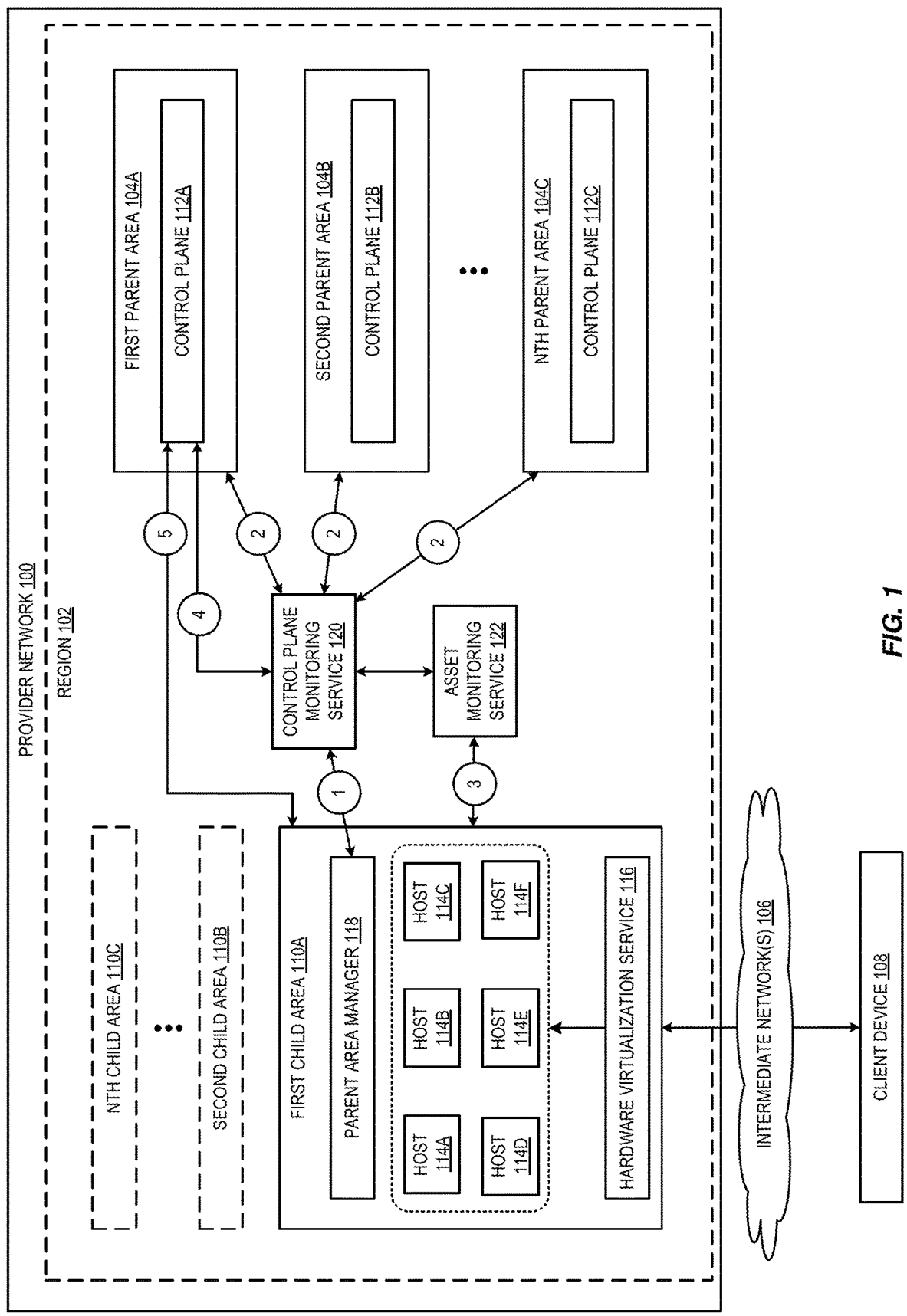
FIG. 1 is a diagram illustrating an environment for setup of a remote control plane with automated failover according to some embodiments.

FIG. 1 is a diagram illustrating an environment for setup of a remote control plane with automated failover according to some embodiments. As shown in FIG. 1, a provider network 100 may make available various resources to users. For example, in FIG. 1, provider network 100 includes a region 102 that may include a plurality of different areas (also referred to as "availability zones"). Each area may be logically isolated from the other (and from any other areas not shown within provider network 100. For example, each area may be a distinct logical data center, supported by one or more physical data centers, and each area may have its own power supply and networking infrastructure to limit the likelihood of a failure in one area from affecting another area. Further, the distribution of the areas within a region can be selected to limit the likelihood that a disaster in one area impacts availability of another area. In the embodiment of FIG. 1, the plurality of areas are all shown as located within region 102, however, in various embodiments provider network 100 may include a plurality of regions, each having its own plurality of areas. Each region of provider network 100 may include resources located in the same geographic area (e.g., state, country, etc.). By dividing provider network 100 into various regions and areas, the data and customer instances stored therein can be protected against failure events. For example, a failure in a first area may not impact the resources in a second area. Likewise, a failure in one geographic region may not affect resources located in another geographic region. As discussed, each area may be geographically distinct, in some embodiments separated by hundreds of miles or more. Each area within a region may be connected via one or more transit networks which comprise a private backbone network connecting the areas. Some implementations may similarly connect regions to one another via a private backbone network. The transit network can transit traffic between each area.

As shown in FIG. 1, the plurality of areas may include parent areas 104A-104 and child area 110A-110C. Each child area may correspond to a location that is remote to its parent area and may include its own infrastructure and hardware, including data center space, networking, and utilities that are provided and managed by provider network 100. However, a child area 110 may not be fully independent from the rest of the region's areas 104. For example, a child area may not have its own control plane; instead, it can be controlled and accessed by the control plane of a remote/geographically distinct area. As such, within provider network 100, the resources available in a child area may appear as a pool of the parent area's capacity. In some embodiments, some control plane features may be provided locally in a child area, while other control plane features may be provided by the remote control plane.

A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

As shown in FIG. 1, the control plane may be distributed across multiple areas, such as control plane 112A-112C which is distributed across the parent areas 104A-104C. The traffic and operations of the provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

While availability zones are typically configured with data plane capacity as well as their own control planes, a child area as described herein may only include data plane capacity or some limited control plane functionality which, for latency or other reasons, require close proximity to the data plane. A child area, as referred to herein, can be implemented in a variety of ways. In some implementations, a child area may be a subset of the provider network that has more limited capacity than a typical area. As one example, this type of child area can be an extension of the provider network substrate including a limited quantity of capacity provided outside of an established region or availability zone (e.g., a small data center located close to a customer workload that is distant from established availability zones). As another example, this type of child area can be a logically isolated subset of data plane capacity in an availability zone that has been determined to have insufficient control plane capacity for its entire data plane. In some implementations, a child area may be an extension of the provider network substrate formed by one or more servers located on-premise in a customer facility, wherein such server(s) communicate over a network (e.g., a publicly-accessible network such as the Internet) with a nearby area/region of the provider network. This "outpost" of the provider network can include a limited quantity of capacity (e.g., compute and storage resources), such that provision of a local control plane within the outpost would constitute a significant percentage reduction in the capacity. Some such outposts may be integrated into telecommunications networks, for example as a multi-edge cloud having physical infrastructure spread across telecommunication data centers, telecommunication aggregation sites, and/or telecommunication base stations with in the telecommunication network. In the on-premise example, the limited capacity of the outpost may be available for use only be the customer who owns the premises (and any other accounts whitelisted by the customer). In the telecommunications example, the limited capacity of the outpost may be shared amongst a number of users of the telecommunications network. The remote substrate extension and outpost examples may be referred to as "edge locations" as they are positioned at the edge of the provider network closest to customer devices and/or workloads.

As such, a child area can be created by adding infrastructure to a geographic area that is remote from the infrastructure of other areas in a region. For example, a child area 110A can be located farther away from the rest of the region than the normal latency time that is expected from a parent area 104A-104C. The child area may be connected to the rest of the region via transit network. Although the latency on the transit network is larger, it is still part of the provider network backbone, and is designed to have the same availability and redundancy characteristics as links that interconnect parent areas. Child areas may include local links, such as via intermediate networks 106, that provide access to the Internet and enable client devices 108 to access the resources of the child area.

As shown, a child area 110A may include a plurality of hosts 114A-114F which may host various resources provided by provider network 100. These hosts and other hardware resources in the child area may comprise the child area's data plane. For example, one or more of the plurality of hosts may host compute instances of a hardware virtualization service 116. These compute instances may execute applications on behalf of a customer and may be accessible to one or more client devices of users via intermediate network 106. The data plane capacity in a child area can be controlled by control plane servers in one or more parent areas. In some implementations, the entire data plane capacity of a child area can be controlled by a single parent area at a time (subject to failover), while in other implementations different subsets of child area data plane capacity can be controlled by different parent areas.

Child area 110A may also include a parent area manager 118. At numeral 1, when a child area is first brought online, the parent area manager 118 can send a request to control plane monitoring service 120 for a control plane to be used to manage the child area. The control plane monitoring service may be a region-wide service that monitors the distributed control planes 112A-112C of the region. 102 and maintains control plane data about each instance of the control plane, as shown at numeral 2. For example, this control plane data may include metrics published by each instance of the control plane about that instance of the control plane, such as available capacity (e.g., how many data plane hosts are being managed in a given region versus how many data plane hosts can be supported by the control plane, current utilization in an area, current performance levels, overall instance health, etc.). The control plane data maintained by the control plane monitoring service 120 may also include a registry or mapping of child areas to parent areas based on, for example, geographic location of the child area and parent areas, available capacity of parent areas, etc. Control plane monitoring service 120 can identify a parent area, such as first parent area 104A, to be the parent area of first child area 110A, based on this control plane data.

In some embodiments, control plane capacity may be determined based on the location of resources being managed to ensure that management of resources is spread to avoid coordinated failure (e.g., a control plane may be over capacity of resources located in one area of a provider network but may be under capacity of resources located in a different area of the provider network.) In some embodiments, control plane capacity may be determined based on where resources are being added to the provider network (e.g., the control plane capacity may take into account planned deployment of additional resources in an area or region). In some embodiments, control plane capacity may be based on a number of hosts allocated to the control plane and the number of resources each control plane host is capable of managing.

As shown at numeral 3, the first child area 110A can also provide a list of hosts and other hardware resources to asset monitoring service 122. Asset monitoring service 122 can maintain an index of hardware resources including identifiers, data defining how to communicate with the hardware resources (e.g., IP addresses or other address data), etc. In various embodiments, the child area can periodically update the asset monitoring service such that the asset monitoring service maintains an up to date index of the child area's hardware resources. In some embodiments, the child area may only update the asset monitoring service 122 when new hardware resources are added to the child area (e.g., when a new server rack is installed, or other resources are added). As shown at numeral 4, control plane monitoring service notify the control plane of the first parent area 104A that it will be managing first child area 110A. In some embodiments, control plane monitoring service can provide the control plane of the first parent area with the asset index for the first child area from asset monitoring service 122. In some embodiments, the control plane monitoring service can provide the control plane 112A with a reference to the asset monitoring service such that it can obtain the asset index. Control plane monitoring service 120 can provide the parent area manager 118 with data to access control plane 112A of the first parent area 104A (e.g., a reference such as a URL, URI, or other address information, security credentials, or other data). At numeral 5, the first child area 110A can connect to the first parent area 104A and a security handshake may be performed. The parent area manager 118 can update application programming interface (API) endpoints and other data to reflect that it is being managed by the control plane 112A of the first parent area 104A. Accordingly, a parent area, as referred to herein, includes a set of servers having control plane functionality. Some parent areas may also have data plane capacity, while some parent areas may have no data plane capacity.

In some embodiments, control plane monitoring service 120 and asset monitoring service 122 may be located in a separate area or region of the provider network 100 from either the child areas or the parent areas which they are monitoring. By locating these services in a separate area or region of the provider network from the areas or regions they are monitoring, the services are not subject to any area-wide or region-wide failures that might affect the resources they are monitoring. For example, if the regional connectivity were to fail and the control plane monitoring service and the asset monitoring service were both located in that region, they would be unable to determine that the failure was region-wide. However, by locating them externally, they can determine that there is a region-wide or area-wide outage and attempt to connect the affected resources to control planes in other regions or areas. In some embodiments, control plane monitoring service 120 and asset monitoring service 122 may be distributed across the parent areas. and may be in their own area of a region or distributed across areas of a region. in some embodiments they may be multi region and spread across multiple regions.

The child area infrastructure is independent of other areas and may be accessed through a local link, such as via intermediate networks 106. As such, even if the child area's parent area were to go down, the resources in the child area would still be reachable by end users. However, because the child area does not have its own control plane, and relies on a parent area's control plane, APIs that depend on the control plane may become unavailable for the child area if the parent area were to go down or becomes unreachable by the child area (e.g., due to power loss, lack of capacity, communication issues, etc.). As such, to ensure a child area can continue operating, control plane monitoring service 120 can also provide automated failover from one parent area to another when it is determined that the first parent area has gone down or otherwise become unavailable.

Figure 2:
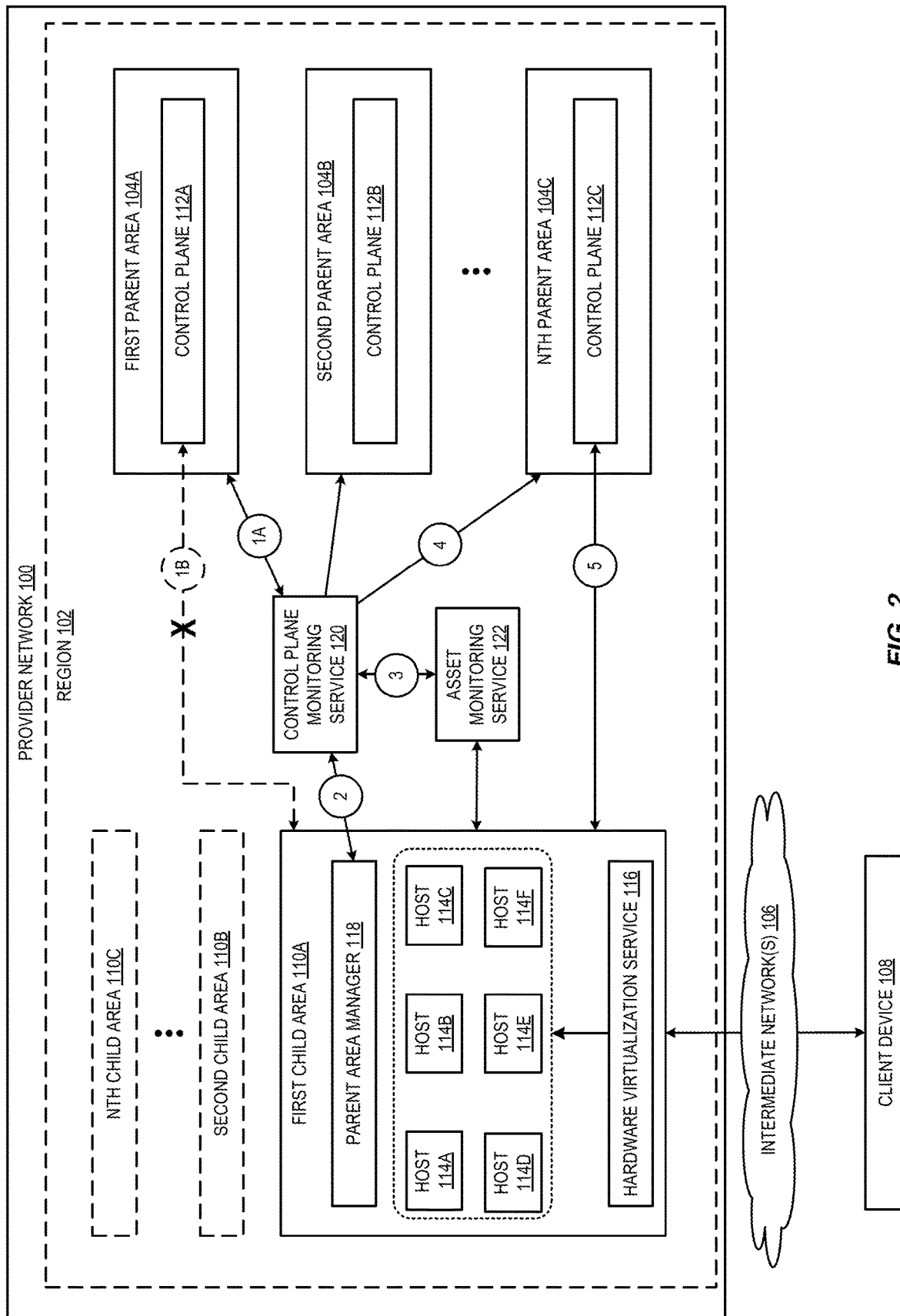
FIG. 2 is a diagram illustrating an environment for automated failover of a remote control plane according to some embodiments.

FIG. 2 is a diagram illustrating an environment for automated failover of a remote control plane according to some embodiments. As shown in FIG. 2, a first child area 110A is being managed by a first parent area 104A. At numeral 1A, the control plane monitoring service 120 may detect that the first parent area has gone down or is otherwise not reachable. For example, a power outage or other event might be affecting the first parent area. In some embodiments, the first parent area 104A may detect that the connection with the first child area 110A has been lost. The first parent area may then notify the control plane monitoring service at 1A that a new area needs to be identified to take over management of the first child area. Additionally, or alternatively, at numeral 1B, the first child area 110A may detect that it has lost contact with the first parent area. For example, the parent area manager 118 and the control plane 112A may exchange heartbeat messages or other data to indicate that the connection is still live. In some embodiments, the control plane 112A may periodically push data to the parent area manager 118 to indicate that the connection is still live, or the parent area manager 118 may periodically pull data from the control plane 112A to indicate that the connection is still live. Once it has been determined that the connection to the first parent area is down, at numeral 2 the parent area manager 118 can request a new area's control plane to manage the child area. In some embodiments, when the control plane monitoring service 120 determines that the first parent area is down, it may notify the child area of the disruption before assigning it a new parent area.

The control plane monitoring service can identify a new parent area to manage the child area based on the control plane data maintained by the control plane monitoring service 122, as discussed above. For example, the next closest (geographically) area may be identified, or a combination of proximity and control plane capacity may be used to identify the new parent area. Once a new parent area has been identified, at numeral 3 the control plane monitoring service can obtain a current asset index for the first child area. As discussed, the asset index may include a list of the hardware resources available in the first child area. At numeral 4, the control plane monitoring service can notify the new parent area (e.g., in the example of FIG. 2, the Nth parent area 104C and control plane 112C) that it will be managing the first child area 110A and to expect to be contacted by the first child area.

At numeral 5, the first child area can contact the Nth parent area's control plane 112C. In some embodiments, any resources in the first child area that had established open connections or used other area-specific data can then update those connections and data to the new parent area (e.g., perform new connection handshakes, etc.). For example, subnet addresses, firewall rules, and other area-specific data can be updated to be compatible with the new control plane. In some embodiments, the new control plane 112C can accept the connection request from the first child area and can request state information from the first child are and/or poll the hardware resources for state data. For example, using the asset index, the new control plane 112 can poll each host to determine what instances are currently running on each host and to obtain other information about what is running on each host. As discussed above, the endpoints (e.g., API endpoints) that were previously associated with first parent area 104A can then be updated to endpoints associated with Nth parent area 104C. When a new request is received in the first child area (e.g., to add a new instance on a host, manage an existing instance, or other request that uses the control plane), the request can be forwarded to the new control plane. In some embodiments, the endpoints utilized by a child area may be abstracted as an alias. Rather than being a hardcoded endpoint (e.g., a particular URL), they may be an identifier (e.g., "Parent Area") which points to the currently managing parent area's endpoints. This may be implemented through an internal domain name system (DNS), which can allow the resources, APIs, etc., to be directed to the same identifier but which has been remapped to a different underlying address. For example, the parent area manager may maintain a mapping of the identifier to the current endpoints. When the failover occurs, the parent area manager 118 can update the mapping to seamlessly redirect traffic to the new endpoints.

In some embodiments, when the first parent area 104A comes back online, there may be an option to failback child areas that had been managed by the first parent area. For example, prior to failover, the first parent area may have been managing three child areas. Upon failure, the first child area 110A failed over to Nth parent area 104C. The other two child areas may have failed over to second parent area 104B, or other available parent area. This may have placed a strain on other parent areas as they are now managing extra child areas. As such, the load of child areas may be rebalanced once the first parent area is back online. In some embodiments, there may be no affinity for a particular child area to be managed by a particular parent area. Instead, the management of child areas can be spread across parent areas in whatever way is most efficient for the provider network 100. In some embodiments, customer preferences may be factored into this spread to limit management of a particular child area to one or more particular parent areas (e.g., due to geographic location, latency, or other customer preferences).

Although embodiments are described with a centralized control plane monitoring service 120, in various embodiments, the control plane monitoring service may be distributed across the areas. When a failover event occurs, the instances of the distributed control plane monitoring service can make determine a new parent area to manage the child area using quorum logic or other consensus algorithm. In some embodiments, one instance of the control plane monitoring service can be elected as primary by the other instances and can make management decisions during failover. If the primary instance goes down, a new instance can be elected primary by the remaining instances. In the event of failover, the primary instance can make the management decisions described above.

Figure 3:
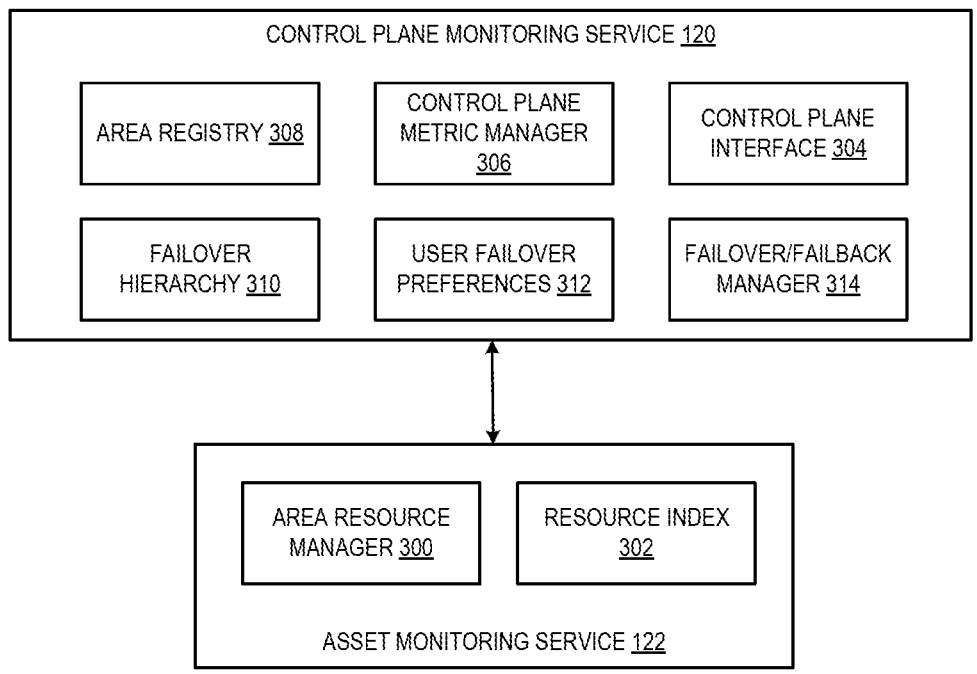
FIG. 3 is a diagram illustrating a control plane monitoring service and an asset monitoring service according to some embodiments.

FIG. 3 is a diagram illustrating a control plane monitoring service and an asset monitoring service according to some embodiments. As discussed, asset monitoring service 122 may obtain resource data for each child area. Asset monitoring service 122 may include an area resource manager 300 that interfaces with each area being monitored. For example, when a new area is brought online it may register with the asset monitoring service via the area resource manager. After registration, the area may periodically provide a current list of hardware resources in the area. In some embodiments, the area may provide only new hardware resources (e.g., a diff of the current infrastructure and the last infrastructure provided). Asset monitoring service 122 can use the list of hardware resources to generate a resource index 302, which includes all hardware resources in an area and includes a type of resources, identifier for the resource, how to communicate with the resource (e.g., IP address or other address information), and other data about the resources. In some embodiments, a separate resource index 302 may be maintained for each area or a single resource index 302 may include an index of resources for all areas that are registered with the asset monitoring service. Upon request, the asset monitoring service 122 can use the data stored in the resource index 302 to provide a current asset index for a requested area.

Control plane monitoring service 120 may interface with a plurality of control planes distributed across a plurality of areas through control plane interface 304. For example, the control plane monitoring service 120 can subscribe to metrics published by each control plane through control plane interface 304. A control plane metric manager 306 may receive the metrics published by the control planes through the control plane interface and maintain a region-wide view of the distributed control plane. For example, the region-wide view may indicate which control planes are online and which are currently down, the utilization of the control planes across the region, the available capacity of the control planes across the region, etc. In some embodiments, the control plane monitoring service 120 may also include an area registry 308 which indicates which child areas are being managed by which parent areas.

The control plane monitoring service 120 may also maintain a failover hierarchy 310. In some embodiments, each child area may be associated with its own failover hierarchy. The failover hierarchy can be a hierarchical tree of backup parent areas and/or regions. For example, each potential backup area and/or region can be assigned weights based on, for example, the geographic distance between the potential backup area and the child area to be managed. In some embodiments, the failover hierarchy can include load balancing logic to ensure that if several nearby areas were to go down at once they all would not failover to a single backup area, which could lead to a cascade of failures through the region. In some embodiments, the control plane monitoring service 120 may maintain user failover preferences 312. These may include geographic, latency (or other performance metric), and/or other requirements to be applied when determining a new control plane to manage a child area. For example, a customer may require that their resources be restricted to a particular country or region of countries. The customer may also require that at least some of their resources to be managed by an area that is close enough such that the latency is below a threshold. The customer may also have a control plane spread requirement, where they do not want all of their resources to be managed by the same control plane. These preferences may be used when constructing the failover hierarchy for a particular customer's area and/or to reject or approve the new control plane that is identified using the failover hierarchy before failover is performed. The control plane monitoring service 120 may also include a failover/failback manager 314 that can manage failover as discussed above (e.g., determining that a control plane is down, identifying a new control plane, notifying the child area and the new control plane of the outage, and instructing the child plane and new control plane to connect, etc.).

Figure 4:
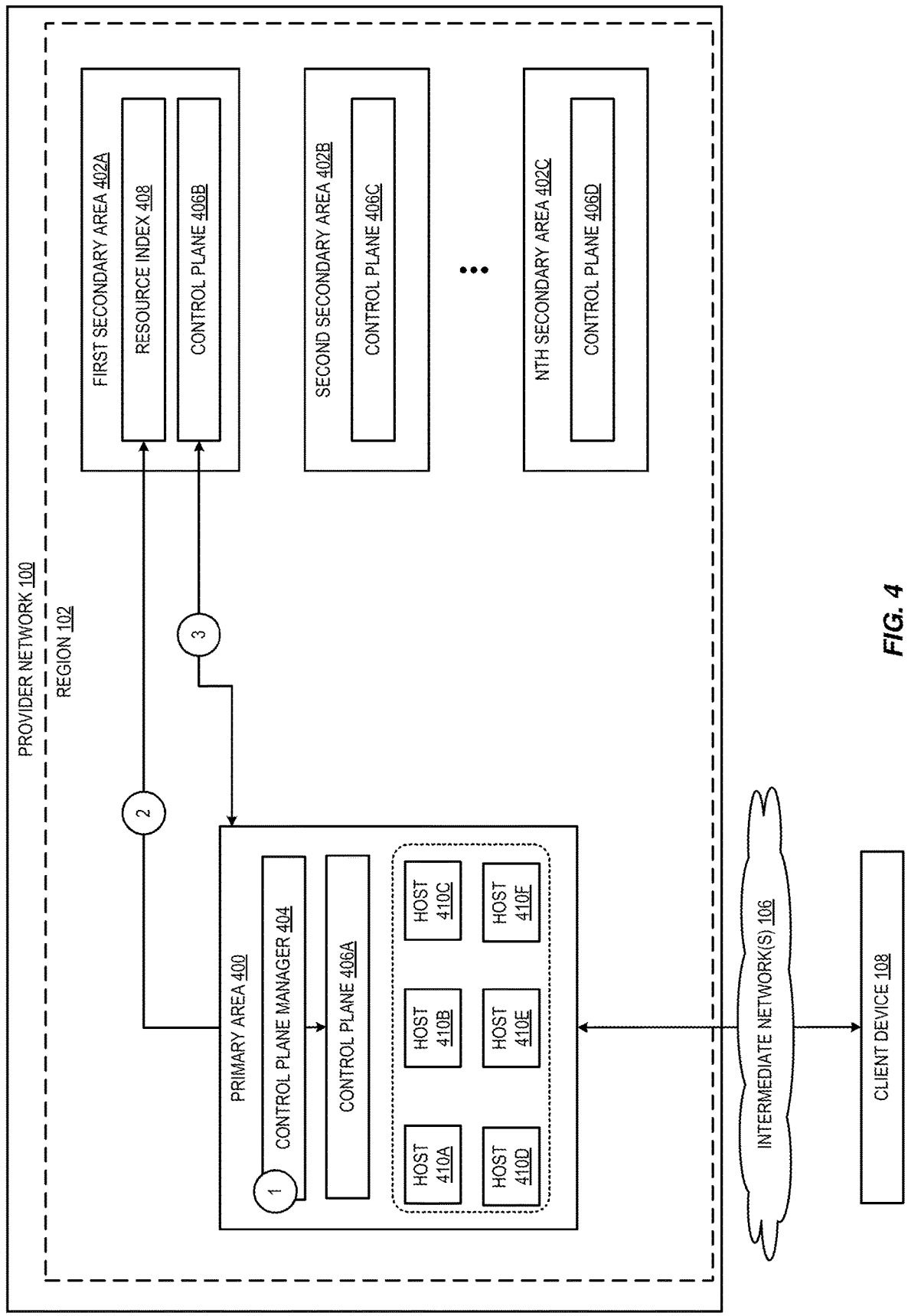
FIG. 4 is a diagram illustrating an environment for automated failover of a control plane from a primary area to a secondary area according to some embodiments.

FIG. 4 is a diagram illustrating an environment for automated failover of a control plane from a primary area to a secondary area according to some embodiments. As discussed above, in child areas the control plane has been decoupled from the data plane which allows the hardware resources of the data plane to be managed by a remote control plane. This is useful in the child area use case because it allows child areas to be deployed without a control plane. Parent areas include their own control plane, however a similar decoupling for a parent area also has a number of benefits. For example, if all or a portion of the control plane of a parent area fails, all or a portion of the data plane can be updated to be managed by one or more backup areas. Additionally, when a control plane needs maintenance, the data plane resources being managed by that control plane can be managed by a different control plane in another region until maintenance is completed. This may also enable control planes to be configured to manage particular hardware resource types (e.g., particular types of servers, etc.). As such, a number of failover events may be defined which cause one area to transfer management of its data plane to a different area's control plane, these events may include but are not limited to a failure of the control plane, scheduled maintenance, performance degradation, communication errors, or other triggers.

As shown in FIG. 4, a region 102 may include a plurality of areas, including a primary area 400 and one or more secondary areas 402A-402C. In some embodiments, each area may identify a backup area to use in the event of a control plane failure event. The example of FIG. 4 shows one primary area and multiple secondary areas to simplify description. However, from each area's perspective, it is the primary area and the other areas are secondary areas. Each area may include a control plane manager that monitors the status of that area's control plane, as shown at numeral 1. In some embodiments, the control plane manager 404 may perform similar functions to the control plane monitoring service described above. The control plane manager can identify at least one secondary area 402A-402C to serve as the backup to the primary area. The primary area may randomly identify the backup area, or the backup area may be identified based on location relative to the primary area, performance characteristics of the secondary area, customer preferences (e.g., country, region, performance, etc.), or other factors. Once the secondary area has been identified, the primary area 400 can periodically send an asset list to the secondary area. For example, at numeral 2, the primary area 400 can send a list of the hardware resources in the primary area (e.g., hosts 410A-410F and other hardware resources of the data plane of primary area 400) to the first secondary area 402A, which is acting as the backup area. The first secondary area 402A may include a resource index 408 similar to the resource index 302 described above. When a failover trigger is detected, the control plane manager 404 can connect to the secondary control plane 406B and transfer management of the hosts 410A-410F and/or other hardware resources of the primary area 400 to the backup control plane, as shown at numeral 3, similar to transferring management of the child areas described above.

Figure 5:
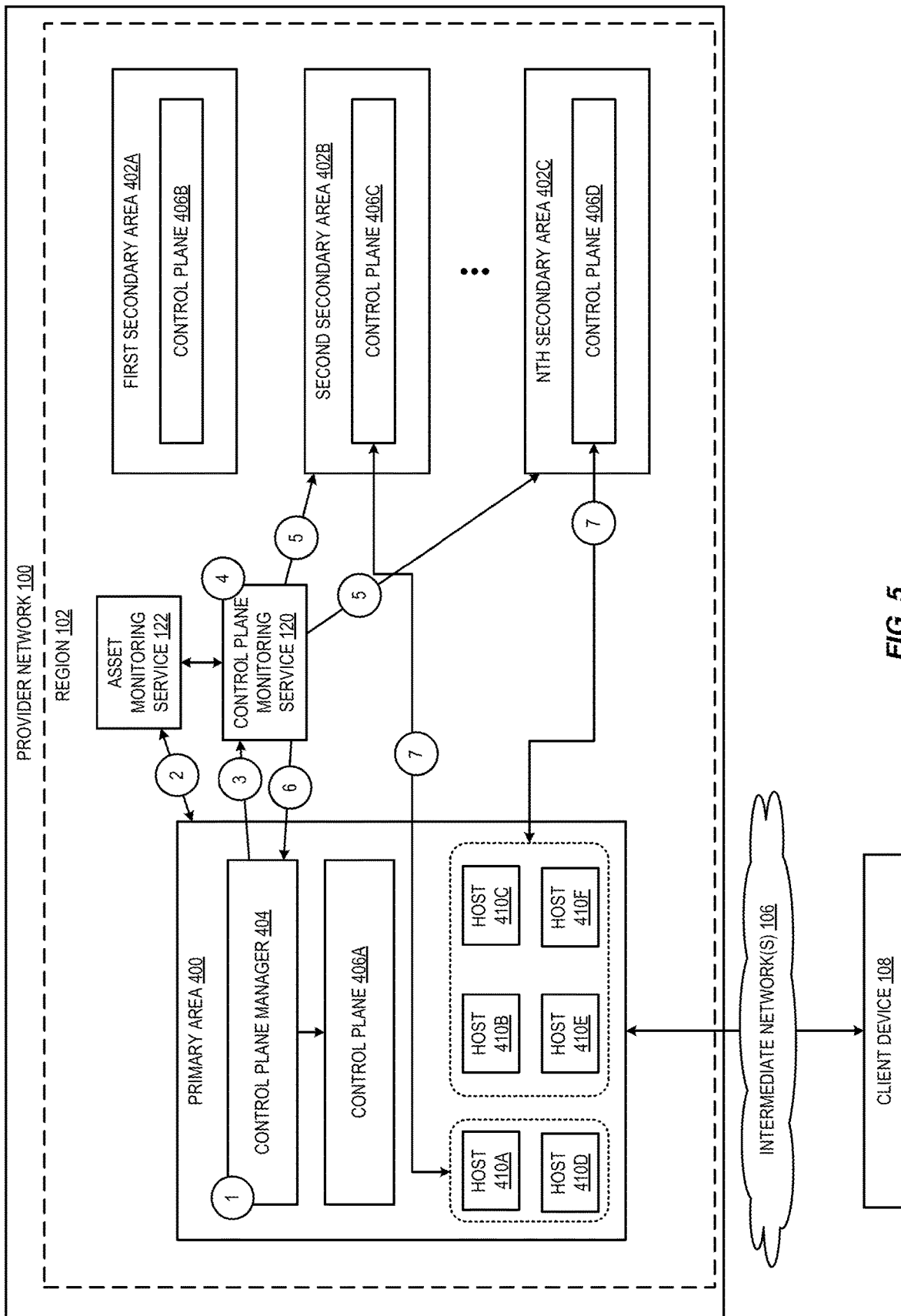
FIG. 5 is a diagram illustrating an environment for automated failover of a control plane from a primary area to a secondary area according to some embodiments.

FIG. 5 is a diagram illustrating an environment for automated failover of a control plane from a primary area to a secondary area according to some embodiments. In the example of FIG. 5, control plane monitoring service 120 may serve as a centralized control plane manager for identifying a secondary area to a primary area and managing failover when a failover trigger is detected. Control plane manager 404 can monitor the control plane 406A of primary area 400, as shown at numeral 1. At numeral 2, the primary area 400 can send a list of the hardware resources in the primary area (e.g., hosts 410A-410F and other hardware resources of the data plane of primary area 400) to asset monitoring service 122. As discussed above, the asset monitoring service 122 can act as a centralized repository of resource indices, enabling another control plane to take over management of the resources in an area using that area's resource index. When a trigger event is detected by control plane manager 404, at numeral 3 it can send a request to control plane monitoring service 120 to identify a new control plane to take over for control plane 406A.

At numeral 4, control plane monitoring service 120 can identify one or more secondary areas' control planes to transfer management of the primary area's resources. For example, at numeral 5, the control plane monitoring service may identify two control planes in two areas to take over resources from primary area 400. As discussed, the control plane monitoring service 120 may identify backup areas using a failover hierarchy, user preferences, distance, and/or performance characteristics to identify the backup area(s) to which to transfer control plane management. At numeral 6, the control monitoring service can instruct the control plane manager to transfer management of one or more hosts to one or more backup control planes in secondary areas. For example, hosts 410A and 410D may be managed by control plane 406C in secondary area 402B and the remaining hosts 410B, 410C, 410E, and 410F may be managed by control plane 406D on Nth secondary area 402C. At numeral 7, management of the resources of primary area 400 can be transferred to the new control plane(s) as described above.

In some embodiments, failover may be triggered when a different control plane is determined to provide improved performance for a particular area than the local control plane or a different remote control plane. In some embodiments, the control plane monitoring service may periodically check other control planes for potential performance improvements. The control plane monitoring service, as discussed, may collect data published by the control planes indicating availability/scalability and performance of different remote areas' control planes. If a different remote control plane is determined to provide improved performance, the area may automatically failover to the new remote control plane. In some embodiments, the customer may be notified before the failover event and given an option to cancel the failover.

Figure 6:
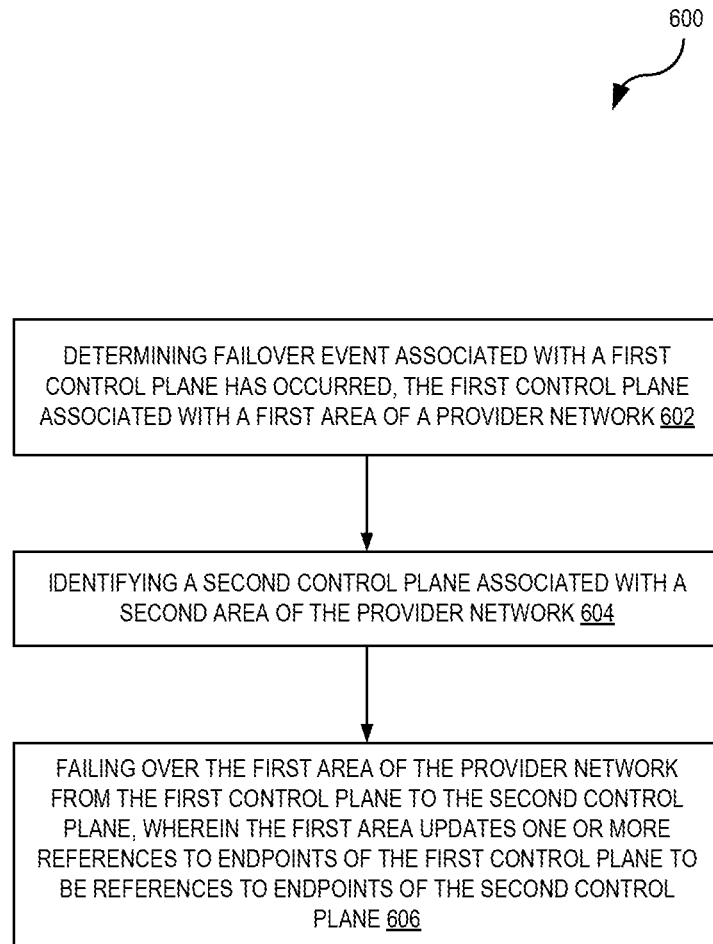
FIG. 6 is a flow diagram illustrating operations of a method for automated failover of remote control planes according to some embodiments.

FIG. 6 is a flow diagram illustrating operations of a method for automated failover of remote control planes according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by at least parent area manager 118, control plane monitoring service 120, asset monitoring service 122 of the other figures.

The operations 600 include, at block 602, determining failover event associated with a first control plane has occurred, the first control plane associated with a first area of a provider network. In some embodiments, the failover event includes at least one of a loss of power at the first control plane, a loss of communication with the first control plane, or scheduled maintenance of the first control plane.

The operations 600 further include, at block 604, identifying a second control plane associated with a second area of the provider network. In some embodiments, the first area of the provider network includes a local control plane, and the second control plane is a remote control plane in the second area of the provider network. In some embodiments, the first area of the provider network is a child area of a third area of the provider network, the third area of the provider network including the first control plane, and wherein the second control plane is a remote control plane in the second area of the provider network.

In some embodiments, identifying a second control plane associated with a second area of the provider network, further comprises selecting the second area of the provider network from a backup hierarchy, the backup hierarchy comprising a hierarchical tree of a plurality of areas of the provider network. In some embodiments, the backup hierarchy is sorted based on a geographic distance of each of the plurality of areas from the first area of the provider network. In some embodiments, the plurality of areas of the provider network are based at least on user preferences, the user preferences including at least one of geographic location and control plane spread. In some embodiments, the operations 600 may further include receiving a plurality of metrics from a plurality of control planes in the provider network, the metrics including at least one of utilization, capacity, or latency, wherein the backup hierarchy is weighted based at least on the plurality of metrics.

The operations 600 further include, at block 606, failing over the first area of the provider network from the first control plane to the second control plane, wherein the first area updates one or more references to endpoints of the first control plane to be references to endpoints of the second control plane. In some embodiments, failing over the first area of the provider network from the first control plane to the second control plane, further comprises obtaining a list of hosts from an asset monitoring service for the first area of the provider network, the list of hosts including a plurality of hosts in the first area of the provider network, and providing the list of hosts to the second control plane.

In some embodiments, the operations 600, may include receiving, by a control plane monitoring service, a request for a remote control plane in a parent area of a provider network to manage a child area of the provider network, wherein the child area of the provider network does not include a local implementation of at least some control plane functionality, identifying, by the control plane monitoring service, a first parent area of the provider network based on a geographic distance between the first parent area of the provider network and the child area of the provider network, instructing, by the control plane monitoring service, the child area to connect to a first remote control plane of the first area, monitoring, by the control plane monitoring service, the first remote control plane of the first area for a failure of the remote control plane, detecting, by the control plane monitoring service, the failure of the first remote control plane, identifying, by the control plane monitoring service, a second control plane in a second area of the provider network, sending, by the control plane monitoring service, a message to the second control plane identifying the child area, and instructing, by the control plane monitoring service, the child area to connect to the second control plane of the first area, wherein the second control plane accepts the connection from the child area and wherein the child area updates one or more references to endpoints of the first control plane to be references to endpoints of the second control plane.

In some embodiments, the operations to send, by the control plane monitoring service, a message to the second control plane identifying the child area, further comprise obtaining, by the control plane monitoring service, a list of hosts from an asset monitoring service for the child area of the provider network, the list of hosts including a plurality of hosts in the child area of the provider network, and providing the list of hosts to the second control plane. In some embodiments, the child area sends a new list of hosts to the asset monitoring service when at least one new host is added to the child area.

In some embodiments, the first area of the provider network is in a first geographic region of the provider network and wherein the second area of the provider network is in a second geographic region of the provider network, the first area of the provider network connected to the second area of the provider network via a transit network.

Figure 7:
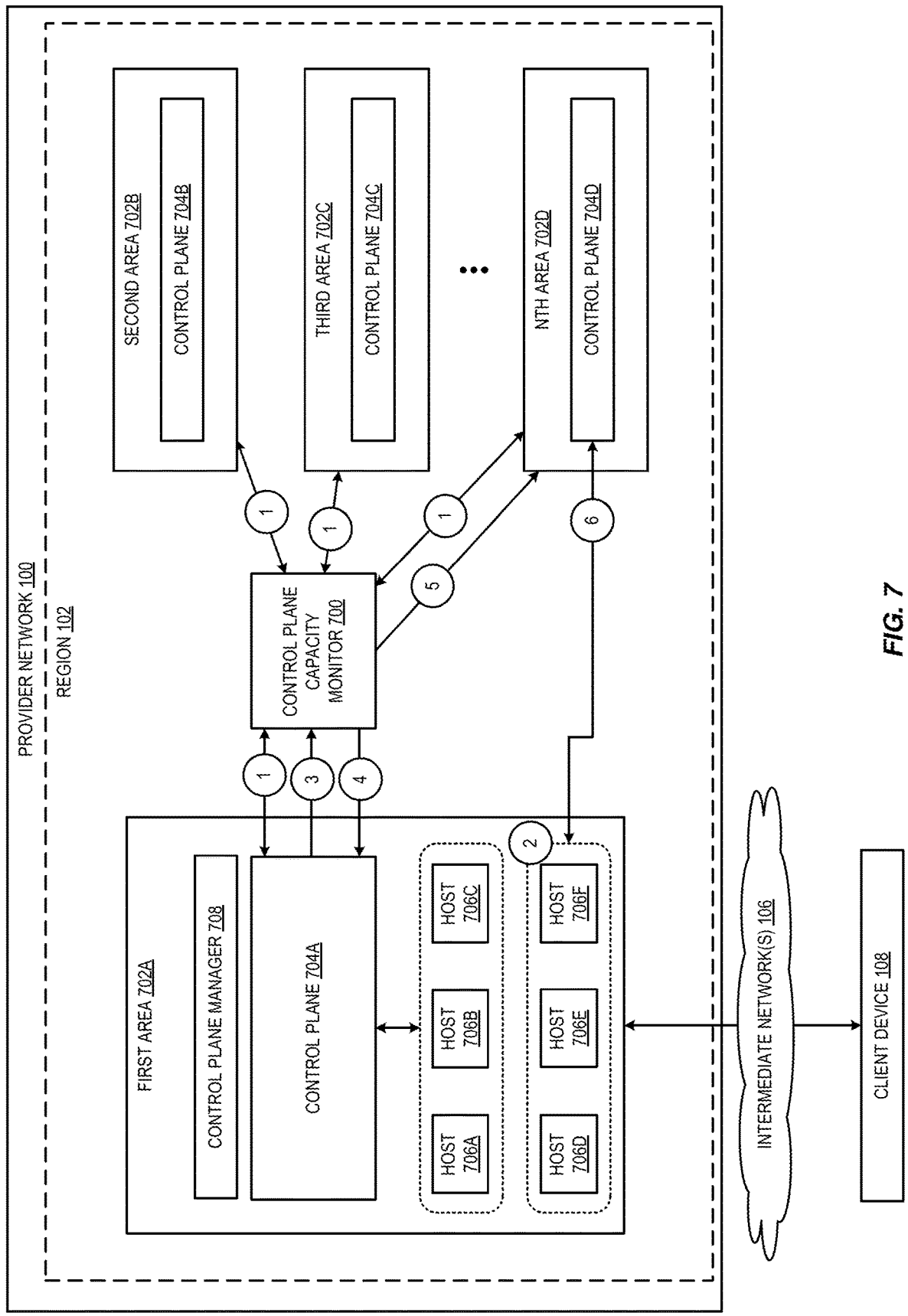
FIG. 7 is a diagram illustrating an environment for capacity bursting using a remote control plane according to some embodiments.

FIG. 7 is a diagram illustrating an environment for capacity bursting using a remote control plane according to some embodiments. As discussed above, the control plane can be decoupled from the data plane of an area and/or region of a provider network 100. This may be useful to provide a failover mechanism that enables an area without a control plane, or an area experiencing a control plane outage, to use the control plane services of a control plane in a different area. Additionally, an area's control plane has a finite capacity. That is, a given control plane can support a finite amount of data plane resources. As such, if an area has new infrastructure added to its data plane (e.g., new hosts, server racks, data centers, or other hardware resources) without an expansion of the infrastructure underlying the area's control plane, then the new resources added to the data plane cannot be managed. This leads to unused resources in the data plane due to a lack of capacity in the control plane. However, embodiments take advantage of the decoupled data plane and control plane to enable these unused data plane resources to be managed by a remote data plane.

As shown at numeral 1, a control plane capacity monitor 700 can monitor control plane capacity of a plurality of control plane instances 704A-704D in a plurality of areas 702A-702D. The control plane monitor can subscribe to a metrics stream published by each instance of the control plane, as discussed above. The first area 702A may include a plurality of hardware resources, including hosts 706A-706C. When a new set of hardware resources is added to first area 702A, such as new hosts 706D-706F, as shown at numeral 2, control plane 704A may determine that it is at capacity and cannot manage the new resources. In some embodiments, control plane 704A may determine that capacity has been exceeded or may determine that performance will be impacted to the existing resources if the new resources are also managed. Depending on the types of resources already being hosted, customer preferences with respect to the performance expectations of those resources, and/or other factors, the control plane 704A may determine that a remote control plane is needed to manage all or some of the newly added resources.

At numeral 3, control plane 704A can send a request to control plane capacity monitor to identify a control plane to manage all or some of the new resources added in first area 702A. The control plane 704A can provide a list of hardware resources to be managed by the remote control plane. In the example of FIG. 7, these hardware resources may include hosts 706D-706F. The control plane capacity monitor can identify a remote control plane to take over management of the new resources similarly to the control plane monitoring service described above. For example, the control plane capacity monitor may maintain a backup hierarchy of other control planes in the region 102. In some embodiments, each area, resource, customer, etc., may be associated with its own backup hierarchy. The backup hierarchy can be a hierarchical tree of backup areas and/or regions. For example, each potential backup area and/or region can be assigned weights based on, for example, the geographic distance between the potential backup area and the area to be managed. In some embodiments, the backup hierarchy can include load balancing logic to ensure that if several nearby areas all exceed capacity at once they all would not all transfer their excess capacity to be managed by a single backup area, which could lead to a cascade of failures through the region. In some embodiments, the control plane capacity monitor 700 may maintain user backup preferences which may include geographic, latency (or other performance metric), and/or other requirements to be applied when determining a new control plane to manage excess capacity in an area. For example, a customer may require that their resources be restricted to a particular country or region of countries. The customer may also require that at least some of their resources to be managed by an area that is close enough such that the latency is below a threshold. The customer may also have a control plane spread requirement, where they do not want all of their resources to be managed by the same control plane. These preferences may be used when constructing the backup hierarchy for a particular customer's resources in an area and/or to reject or approve the new control plane that is identified using the failover hierarchy before failover is performed.

Once a backup area has been identified, at numeral 4 the control plane 704A of the first area may be notified of the transfer and the control plane of the backup area (in this example the Nth area 702D) may be notified of the transfer, as shown at numeral 5. The notification sent to the control plane of the first area may include a reference to the control plane of the backup area, such as an identifier associated with the backup area, and one or more endpoints associated with the control plane of the backup area. The notification sent to the control plane of the backup area may include a reference to the control plane of the first area, such as an identifier associated with the first area, and one or more endpoints associated with the control plane of the first area. The notification sent to the control plane of the backup area may also include identifiers associated with one or more resources in the first area to be managed by the control plane of the backup area, such as resource identifiers, rack identifiers, etc. In some embodiments, the identifiers associated with the resources to be managed by the backup area may be provided by the control plane of the first area after the backup area has been identified. The resources to be managed by the backup area may include any hardware resources in the first area, including the preexisting resources, the newly added resources, or any combination thereof.

At numeral 6, the resources may connect to the remote control plane 704D. Depending on whether the new resources have any area-specific requirements, the new resources may need to establish a new handshake with the remote control plane 704D. A control plane manager 708 can update endpoints for APIs and other control plane services associated with the new resources so that new requests that come in for these resources are forwarded to the backup control plane 704D rather than the first area's local control plane 704A. Subsequently, if the control plane 704A is expanded (e.g., if new resources are added to the infrastructure supporting control plane 704A), then the management of the new resources may be transferred back to the local control plane 704A.

In some embodiments, the control plane capacity monitor 700 may identify a control plane in a second region of the provider network to offload management of one or more resources from the first area of the provider network. For example, provider network 100 may include dedicated regions of control plane capacity that do not include any data plane capacity. These dedicated regions may only provide remote management of data plane capacity in other regions and/or areas of the provider network 100.

In some embodiments, resources in one area of the provider network may not have affinity to a control plane in the same area. For example, when a resource is added to an area of the provider network, it can send a request to control plane manager 708 for a control plane to manage the new resource. the control plane manager can request an available control plane from control plane capacity monitor. As discussed above, the control plane capacity monitor can identify a control plane to manage a resource based on the geographic locations of the resource and the control plane, user preferences associated with control plane location, etc. Each new resource added to an area can therefore be matched to the control plane best suited to manage the new resource, even if that control plane is in a remote area or region of the provider network. Additionally, the control planes in use to manage resources may be periodically reallocated based on current control plane capacity, user preferences, etc. to optimize the management of resources by the control planes best suited to perform the management functions.

Figure 8:
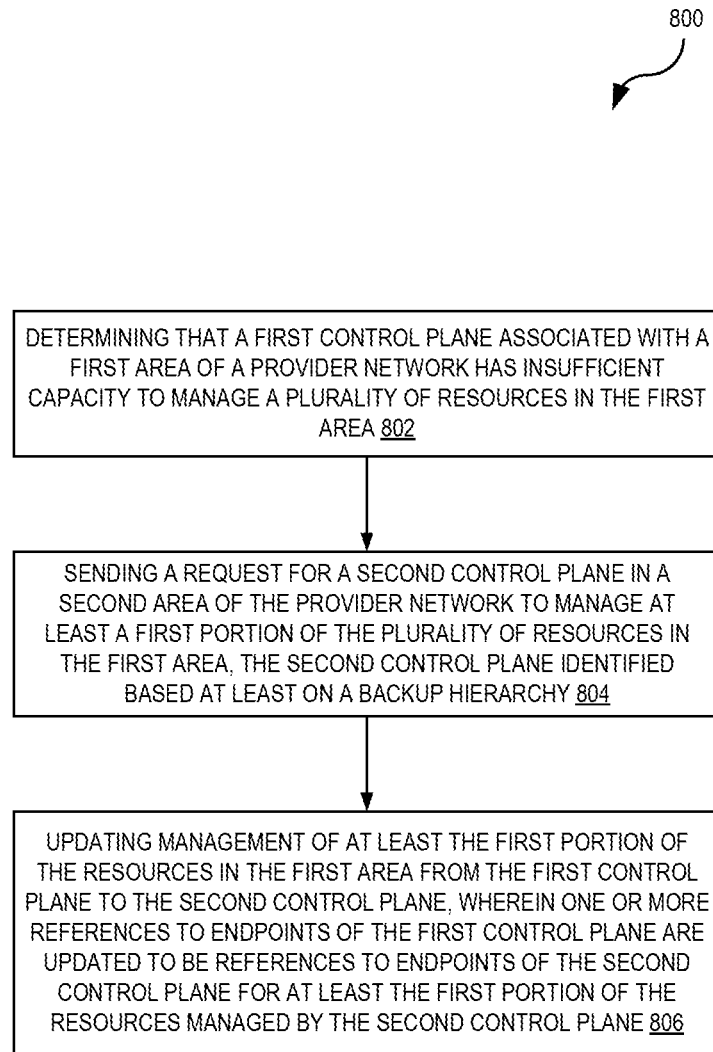
FIG. 8 is a flow diagram illustrating operations of capacity bursting using a remote control plane according to some embodiments.

FIG. 8 is a flow diagram illustrating operations of capacity bursting using a remote control plane according to some embodiments. Some or all of the operations 800 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 800 are performed by control plane capacity monitor 700, control plane 704A-704D, control plane manager 708, etc. of the other figures.

The operations 800 include, at block 802, determining that a first control plane associated with a first area of a provider network has insufficient capacity to manage a plurality of resources in the first area. In some embodiments, the first area of the provider network may have insufficient capacity due to new resources being added to a data plane of the first area without adding new resources to the first control plane.

The operations 800 further include, at block 804, sending a request for a second control plane in a second area of the provider network to manage at least a first portion of the plurality of resources in the first area, the second control plane identified based at least on a backup hierarchy. In some embodiments, the second area is in a second region of the provider network. In some embodiments, the second region of the provider network includes only control plane capacity for managing hosts in remote regions of the provider network. In some embodiments, the backup hierarchy comprises a hierarchical tree of a plurality of areas of the provider network. In some embodiments, the backup hierarchy is weighted based on at least one of a geographic distance of each of the plurality of areas from the first area of the provider network and user preferences.

The operations 800 further include, at block 806, updating management of at least the first portion of the resources in the first area from the first control plane to the second control plane, wherein one or more references to endpoints of the first control plane are updated to be references to endpoints of the second control plane for at least the first portion of the resources managed by the second control plane.

In some embodiments, the operations 800 may further include identifying a plurality of new resources added to the first area of the provider network, the plurality of new resources corresponding to at least the first portion of the plurality of resources, and sending at least one reference to at least one resource from the plurality of new resources to be managed by the second control plane. In some embodiments, the operations 800 may further include sending a request for a third control plane in a third area of the provider network to manage at least a second portion of the resources in the first area, the third control plane identified based at least on the backup hierarchy.

In some embodiments, the operations 800 may further include deploying a second plurality of resources to the first area, the second plurality of resources associated with the first control plane. In some embodiments, the operations 800 may further include determining the first control plane has sufficient capacity to manage the plurality of resources, and updating management of at least the first portion of the resources in the first area from the second control plane back to the first control plane.

In some embodiments, the operations 800 may include determining, by a control plane manager of a first area of a provider network, that the first area of the provider network has obtained a plurality of new hosts, determining, by the control plane manager, that a first control plane associated with the first area of the provider network has insufficient capacity to manage the plurality of new hosts, sending, by the control plane manager to a control plane capacity monitor, a request for a second control plane in a second area of the provider network to manage the plurality of new hosts, the control plane capacity monitor to identify the second control plane based at least on a geographic distance between the first area of the provider network and the second area of the provider network, receiving, by the control plane manager, a reference to the second control plane and the second area of the provider network, sending, by the control plane manager, at least one reference to at least one host from the plurality of new hosts to be managed by the second control plane, receiving, by the control plane manager, an instruction to connect to the second control plane of the second area, and updating, by the control plane manager, one or more references to endpoints of the first control plane to be references to endpoints of the second control plane for the at least one host from the plurality of new hosts managed by the second control plane.

In some embodiments, the control plane capacity monitor receives metrics published by a plurality of control planes associated with a plurality of areas of the provider network, the metrics including at least available capacity of each of the plurality of control planes. In some embodiments, the second area of the provider network is in a second region of the provider network, the second region of the provider network including only control plane capacity for managing hosts in remote regions of the provider network.

In some embodiments, the plurality of resources in the first area include a plurality of existing resources and a plurality of new resources that have been added to the area, wherein at least the first portion of the plurality of resources corresponds to one or more resources from the plurality of existing resources. In some embodiments, the operations may further include identifying a plurality of new resources added to the first area of the provider network, identifying a plurality of control planes to manage the plurality of new resources, each new resource to be managed by a different control plane from the plurality of control planes, and sending a reference to each of the plurality of new resources, the reference corresponding to a control plane from the plurality of control planes corresponding to that resource.

Figure 9:
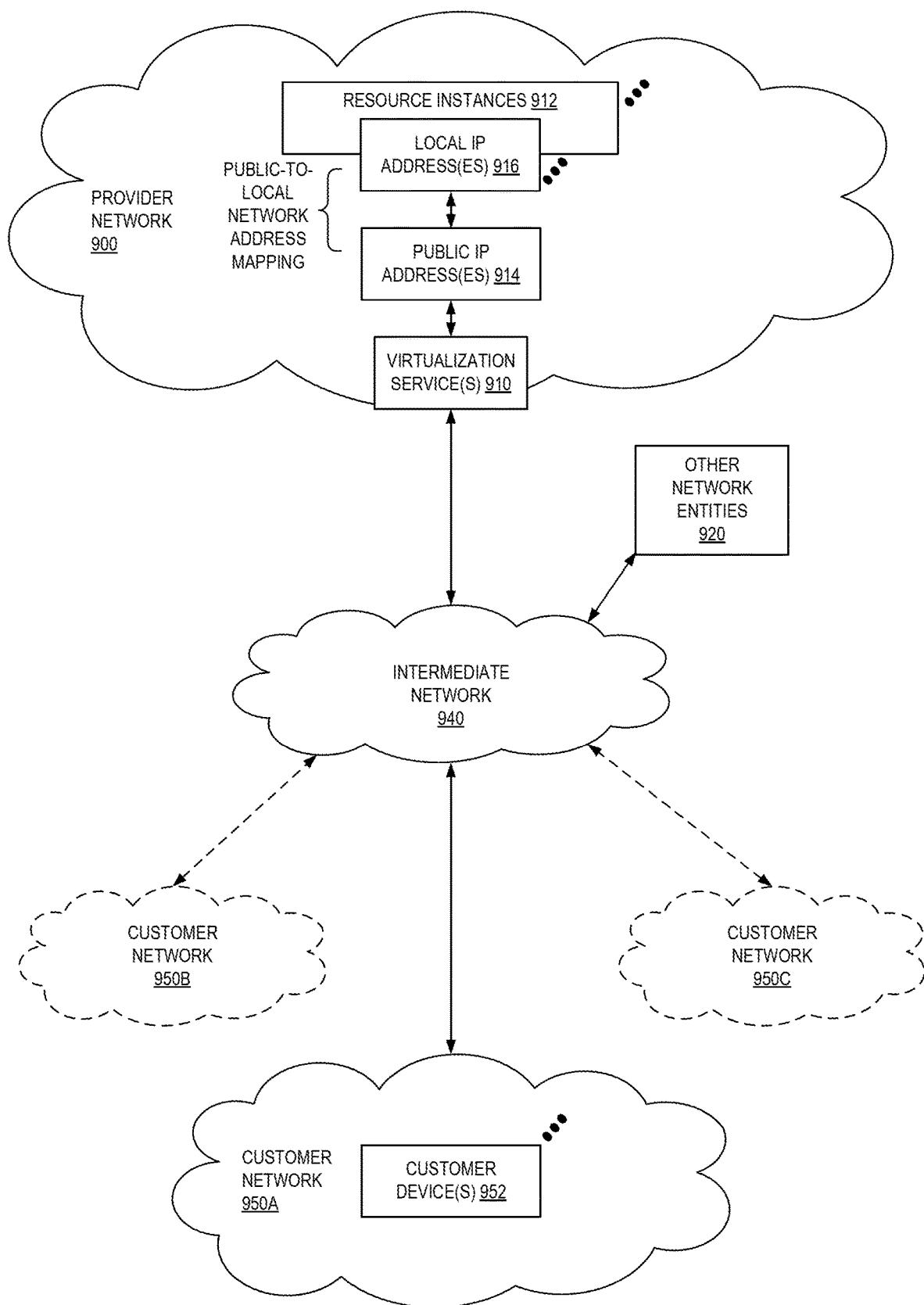
FIG. 9 illustrates an example provider network environment according to some embodiments.

FIG. 9 illustrates an example provider network (or "service provider system") environment according to some embodiments. A provider network 900 may provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 may be associated with the resource instances 912; the local IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that customers may obtain from the provider 900.

Conventionally, the provider network 900, via the virtualization services 910, may allow a customer of the service provider (e.g., a customer that operates one or more client networks 950A-950C including one or more customer device(s) 952) to dynamically associate at least some public IP addresses 914 assigned or allocated to the customer with particular resource instances 912 assigned to the customer. The provider network 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of customer network(s) 950A-950C may, for example, implement customer-specific applications and present the customer's applications on an intermediate network 940, such as the Internet. Other network entities 920 on the intermediate network 940 may then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 900; a customer may then assign their allocated public IP addresses to particular resource instances allocated to the customer. These public IP addresses may be referred to as customer public IP addresses, or simply customer IP addresses. Instead of being assigned by the provider network 900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
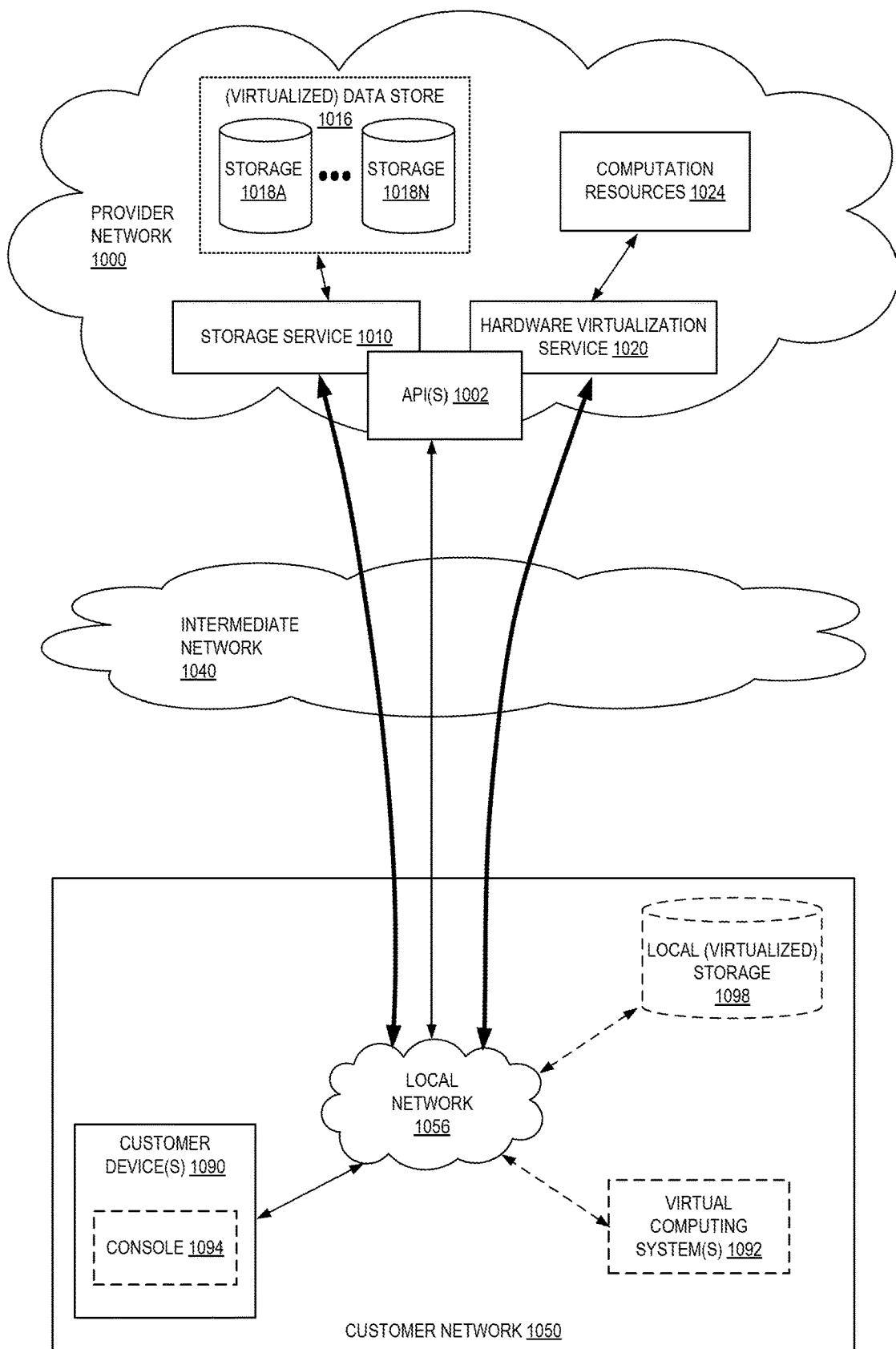
FIG. 10 is a block diagram of an example provider network that provides a storage service and a hardware virtualization service to customers according to some embodiments.

FIG. 10 is a block diagram of an example provider network that provides a storage service and a hardware virtualization service to customers, according to some embodiments. Hardware virtualization service 1020 provides multiple computation resources 1024 (e.g., VMs) to customers. The computation resources 1024 may, for example, be rented or leased to customers of the provider network 1000 (e.g., to a customer that implements customer network 1050). Each computation resource 1024 may be provided with one or more local IP addresses. Provider network 1000 may be configured to route packets from the local IP addresses of the computation resources 1024 to public Internet destinations, and from public Internet sources to the local IP addresses of computation resources 1024.

Provider network 1000 may provide a customer network 1050, for example coupled to intermediate network 1040 via local network 1056, the ability to implement virtual computing systems 1092 via hardware virtualization service 1020 coupled to intermediate network 1040 and to provider network 1000. In some embodiments, hardware virtualization service 1020 may provide one or more APIs 1002, for example a web services interface, via which a customer network 1050 may access functionality provided by the hardware virtualization service 1020, for example via a console 1094 (e.g., a web-based application, standalone application, mobile application, etc.). In some embodiments, at the provider network 1000, each virtual computing system 1092 at customer network 1050 may correspond to a computation resource 1024 that is leased, rented, or otherwise provided to customer network 1050.

From an instance of a virtual computing system 1092 and/or another customer device 1090 (e.g., via console 1094), the customer may access the functionality of storage service 1010, for example via one or more APIs 1002, to access data from and store data to storage resources 1018A-1018N of a virtual data store 1016 (e.g., a folder or "bucket", a virtualized volume, a database, etc.) provided by the provider network 1000. In some embodiments, a virtualized data store gateway (not shown) may be provided at the customer network 1050 that may locally cache at least some data, for example frequently-accessed or critical data, and that may communicate with storage service 1010 via one or more communications channels to upload new or modified data from a local cache so that the primary store of data (virtualized data store 1016) is maintained. In some embodiments, a user, via a virtual computing system 1092 and/or on another customer device 1090, may mount and access virtual data store 1016 volumes via storage service 1010 acting as a storage virtualization service, and these volumes may appear to the user as local (virtualized) storage 1098.

While not shown in FIG. 10, the virtualization service(s) may also be accessed from resource instances within the provider network 1000 via API(s) 1002. For example, a customer, appliance service provider, or other entity may access a virtualization service from within a respective virtual network on the provider network 1000 via an API 1002 to request allocation of one or more resource instances within the virtual network or within another virtual network.

Illustrative System

Figure 11:
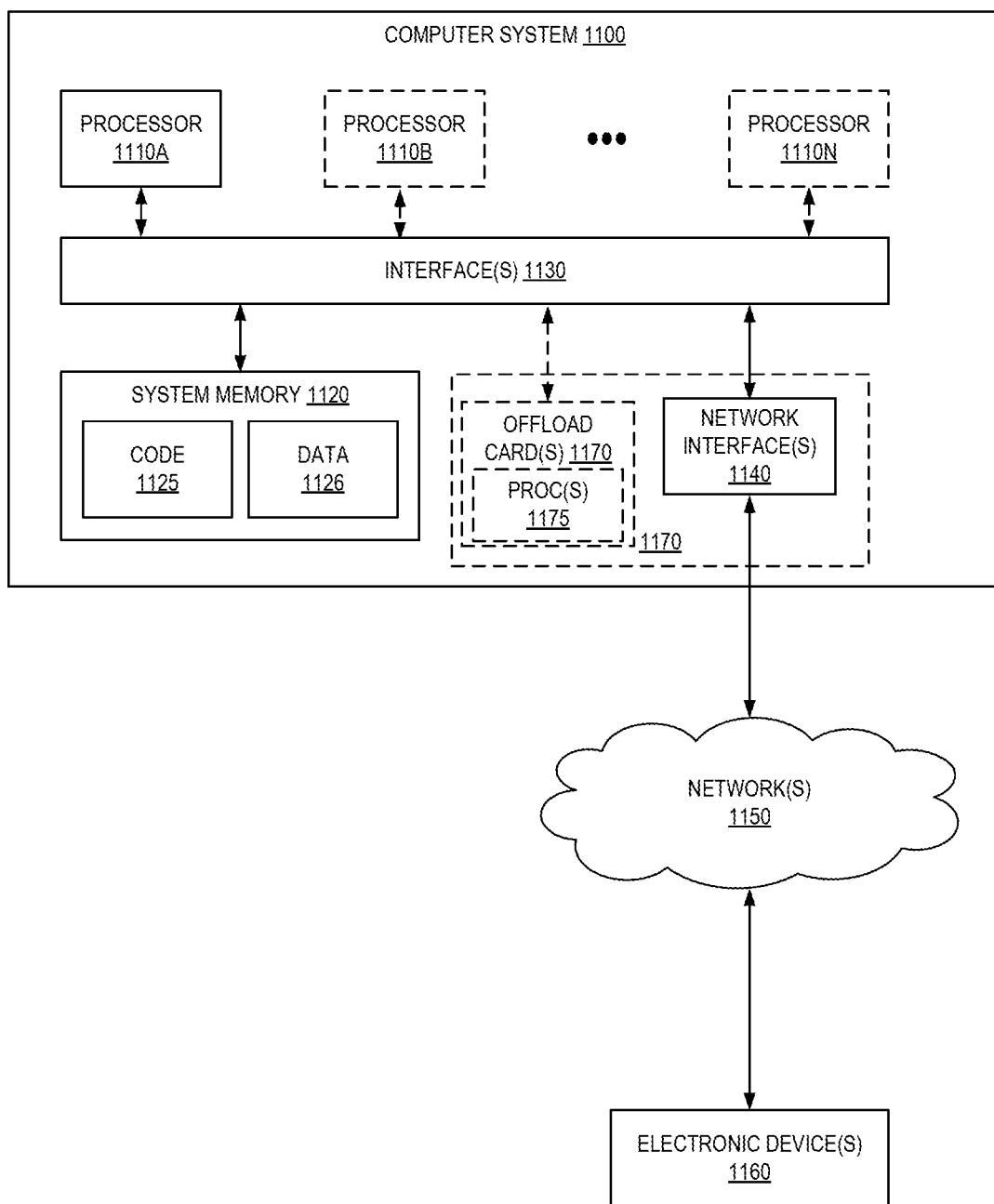
FIG. 11 is a block diagram illustrating an example computer system that may be used in some embodiments.

In some embodiments, a system that implements a portion or all of the techniques for remote control planes with automated failover as described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1120 as code 1125 and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170 (including one or more processors 1175, and possibly including the one or more network interfaces 1140) that are connected using an I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some embodiments the offload card(s) 1170 can perform compute instance management operations such as pausing and/or un-pausing compute instances, launching and/or terminating compute instances, performing memory transfer/copying operations, etc. These management operations may, in some embodiments, be performed by the offload card(s) 1170 in coordination with a hypervisor (e.g., upon a request from a hypervisor) that is executed by the other processors 1110A-1110N of the computer system 1100. However, in some embodiments the virtualization manager implemented by the offload card(s) 1170 can accommodate requests from other entities (e.g., from compute instances themselves), and may not coordinate with (or service) any separate hypervisor.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 104A-104C, 110A-110C, 112A-112C, 114A-114F, 402A-402C, 406A-406D, 410A-410F, 702A-702D, 704A-704D, 706A-706F, 1018A-1018N, etc.) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, by a control plane monitoring service, a request for a remote control plane in a parent area of a provider network to manage a child area of the provider network, wherein the child area of the provider network does not include a local implementation of at least some control plane functionality;
   identifying, by the control plane monitoring service, a first parent area of the provider network based on a geographic distance between the first parent area of the provider network and the child area of the provider network;
   instructing, by the control plane monitoring service, the child area to connect to a first remote control plane of the first parent area;
   monitoring, by the control plane monitoring service, the first remote control plane of the first parent area for a failure of the first remote control plane;
   detecting, by the control plane monitoring service, the failure of the first remote control plane;
   identifying, by the control plane monitoring service, a second control plane in a second parent area of the provider network;
   sending, by the control plane monitoring service, a message to the second control plane identifying the child area; and
   instructing, by the control plane monitoring service, the child area to connect to the second control plane of the second parent area, wherein the second control plane accepts a connection from the child area and wherein the child area updates one or more references to endpoints of the first remote control plane to be references to endpoints of the second control plane.

2. The computer-implemented method of claim 1, wherein sending, by the control plane monitoring service, a message to the second control plane identifying the child area, further comprises:
obtaining, by the control plane monitoring service, a list of hosts from an asset monitoring service for the child area of the provider network, the list of hosts including a plurality of hosts in the child area of the provider network; and
providing the list of hosts to the second control plane.

3. The computer-implemented method of claim 2, wherein the child area sends a new list of hosts to the asset monitoring service when at least one new host is added to the child area.

4. A computer-implemented method comprising:
determining a failover event associated with a first control plane has occurred, the first control plane associated with a first child area of a provider network, the first child area of the provider network comprising a data plane, wherein the first child area of the provider network does not include a local implementation of at least some control plane functionality;
identifying a second remote control plane in a second area of the provider network to manage the data plane in the first child area of the provider network, the second area of the provider network being geographically distinct from the first child area of the provider network; and
failing over the first child area of the provider network from management of the data plane in the first child area by the first control plane to management of the data plane in the first child area by the second remote control plane, wherein the first child area updates one or more references to endpoints of the first control plane to be references to endpoints of the second remote control plane.

5. The computer-implemented method of claim 4, wherein the first child area of the provider network includes a local control plane.

6. The computer-implemented method of claim 4, wherein the first child area of the provider network is a child area of a third parent area of the provider network, the third parent area of the provider network including the first control plane.

7. The computer-implemented method of claim 4, wherein identifying the second remote control plane associated with the second area of the provider network, further comprises:
selecting the second area of the provider network from a backup hierarchy, the backup hierarchy comprising a hierarchical tree of a plurality of areas of the provider network.

8. The computer-implemented method of claim 7, wherein the backup hierarchy is sorted based on a geographic distance of each of the plurality of areas from the first child area of the provider network.

9. The computer-implemented method of claim 7, wherein the plurality of areas of the provider network are based at least on user preferences, the user preferences including at least one of geographic location and control plane spread.

10. The computer-implemented method of claim 7, further comprising:
receiving a plurality of metrics from a plurality of control planes in the provider network, the metrics including at least one of utilization, capacity, or latency; and
wherein the backup hierarchy is weighted based at least on the plurality of metrics.

11. The computer-implemented method of claim 4, wherein failing over the first child area of the provider network from the first control plane to the second remote control plane, further comprises:
obtaining a list of hosts from an asset monitoring service for the first child area of the provider network, the list of hosts including a plurality of hosts in the first child area of the provider network; and
providing the list of hosts to the second remote control plane.

12. The computer-implemented method of claim 4, wherein the failover event includes at least one of a loss of power at the first control plane, a loss of communication with the first control plane, or scheduled maintenance of the first control plane.

13. The computer-implemented method of claim 4, wherein the first child area of the provider network is connected to the second area of the provider network via a transit network.

14. A system comprising:
a first one or more electronic devices to implement a first child area of a provider network, the first child area including a plurality of resources; and
a second one or more electronic devices to implement a control plane monitoring service, the control plane monitoring service including instructions that upon execution cause the control plane monitoring service to:
determine a failover event associated with a first control plane has occurred, the first control plane associated with the first child area of the provider network, the first child area of the provider network comprising a data plane, the first child area comprising no or only limited control plane functionality for managing the data plane in the first child area;
identify a second remote control plane in a second area of the provider network to manage the data plane in the first child area of the provider network, the second area of the provider network being geographically distinct from the first child area of the provider network; and
fail over the first child area of the provider network from the first control plane to the second remote control plane, wherein the first child area updates one or more references to endpoints of the first control plane to be references to endpoints of the second remote control plane.

15. The system of claim 14, wherein the first child area of the provider network includes a local control plane.

16. The system of claim 14, wherein the first child area of the provider network is a child area of a third parent area of the provider network, the third parent area of the provider network including the first control plane.

17. The system of claim 14, wherein the instructions to identify the second remote control plane associated with the second area of the provider network, when executed, further cause the control plane monitoring service to:
select the second area of the provider network from a backup hierarchy, the backup hierarchy comprising a hierarchical tree of a plurality of areas of the provider network.

18. The system of claim 17, wherein the backup hierarchy is sorted based on a geographic distance of each of the plurality of areas from the first child area of the provider network.

19. The system of claim 17, wherein the plurality of areas of the provider network are based at least on user preferences, the user preferences including at least one of geographic location and control plane spread.

20. The system of claim 17, wherein the instructions, when executed, further cause the control plane monitoring service to:
- receive a plurality of metrics from a plurality of control planes in the provider network, the metrics including at least one of utilization, capacity, or latency; and
- wherein the backup hierarchy is weighted based at least on the plurality of metrics.

* * * * *